United States Patent [19]

Kalogeros et al.

[11] Patent Number: 4,659,285
[45] Date of Patent: Apr. 21, 1987

[54] TURBINE COVER-SEAL ASSEMBLY

[75] Inventors: Robert R. Kalogeros, Glastonbury; Gary F. Chaplin, Vernon, both of Conn.

[73] Assignee: United Technologies Corporation, Hartford, Conn.

[21] Appl. No.: 633,727

[22] Filed: Jul. 23, 1984

[51] Int. Cl.[4] .................................................. F01D 5/32
[52] U.S. Cl. ...................... 416/95; 416/220 R
[58] Field of Search ............. 416/95, 220 R, 221, 416/193 A; 415/199.5

[56] References Cited

U.S. PATENT DOCUMENTS

| | | | |
|---|---|---|---|
| 2,985,426 | 5/1961 | Hunter et al. | 416/97 R |
| 3,137,478 | 6/1964 | Farrell | 416/220 R |
| 3,887,298 | 6/1975 | Hess et al. | 416/95 X |
| 4,033,705 | 7/1977 | Luebering | 416/221 X |
| 4,439,107 | 3/1984 | Antonellis | 416/95 |
| 4,470,757 | 9/1984 | Vollinger | 416/221 |
| 4,480,959 | 11/1984 | Bourguignon et al. | 416/220 R |
| 4,484,858 | 11/1984 | Kurosawa et al. | 416/95 |
| 4,505,640 | 3/1985 | Hsing et al. | 416/219 R X |
| 4,507,052 | 3/1985 | Thompson | 416/95 X |
| 4,523,890 | 6/1985 | Thompson | 416/95 |

Primary Examiner—Everette A. Powell, Jr.
Attorney, Agent, or Firm—Norman Friedland

[57] ABSTRACT

The cover plates defining windage covers adjacent the broached rim of the turbine disk has the dual function of insulating the disk rim by defining a gap between the rim and turbine blades for receiving cooler air and insulating the disk from the gas path resulting in a cooler disk.

2 Claims, 3 Drawing Figures

TURBINE COVER-SEAL ASSEMBLY

CROSS REFERENCE

This invention is related to the inventions disclosed in copending patent applications entitled TURBINE SIDE PLATE ASSEMBLY now U.S. Ser. No. 633,722, ROTATING SEAL FOR GAS TURBINE ENGINE now U.S. Ser. No. 633,723, and BREACH LOCK ANTI-ROTATION KEY now U.S. Ser. No. 633,721, filed by Robert R. Kalogeros, Gary P. Peters and Robert R. Kalogeros, respectively on even date and all assigned to the same assignee of this application.

TECHNICAL FIELD

This invention relates to turbines for gas turbine engines and particularly to cover plates that fit adjacent the broached recesses in the turbine disk and extend into the recess below turbine blades to form an insulation barrier.

BACKGROUND ART

The patent application entitled ROTATING SEAL FOR GAS TURBINE ENGINE filed by Gary Paul Peters on even date, supra discloses an invention that constitutes an improvement over the lenticular seal disclosed and claimed in U.S. Pat. No. 3,733,146 granted to S. L. Smith & P. E. Voyer on May 15, 1973 and assigned to the same assignee as this patent application. This patent discloses a toroidally shaped seal disposed between the 1st and 2nd turbine and is lenticular in cross section. Essentially, the inner and outer curved plates form an elliptical body that has its narrow ends abut against the adjacent disks of the turbines or the side plates thereof. This, in fact, forms a point attachment in cross section, and a circumferential edge attachment in full, being supported radially by the turbine disks and transmitting the axial load through both curved plates. In operation, the plates achieved their results, that is, net reduced stress, by virtue of the bending of the plates. Obviously, the higher the bending loads the heavier the plates have to be so as to tolerate the higher bending stresses. The seal disclosed in the patent application, supra, is an "I" Beam shaped, in cross section seal, where the outer rim spans between adjacent stages of turbines and engage the disks in a judicial manner.

In the type of turbine/seal construction disclosed in the U.S. Pat. No. 3,733,146 supra, it is typical to include cover plates on the front face of the 1st and 2nd stage turbines adjacent the juncture where the root of the blade fits into the broached recess in the turbine disk. The cover-seals (sometimes referred to as mail boxes because of the likeness in shape) are a plurality of flat elements (one for each blade) that are spaced around the circumference of the disk. An extension from the rear of the flat element extends into the broached fir tree recess at the juncture where the root of the turbine blade fits into this recess. In the prior art designs the sole purpose of the cover plate was to define an aerodynamically smooth contour on the face of the disk to avoid pressure penalty. Thus it was merely a windage cover.

I have found that I can utilize these cover-seals not only as a windage cover but also to attain a cooling of the disk. According to the invention the axial extension of the cover extending into the broach area radially outside the disk rim and radially supported by the blade, is judiciously spaced radially from the rim to provide a dead ended annular space. The cooler air in the root cavity migrates to this space and insulates the disk rim from the engine's extremely hot working medium that is acting on the turbine blades. Tests have shown that this feature reduces the disk rim temperature by over 100° F. which (1) increases the disk low cycle fatigue life and (2) allows the use of less expensive material from which the disk is fabricated.

DISCLOSURE OF INVENTION

An object of this invention is to provide an improved cover for the turbine rotor of a gas turbine type power plant. A feature of this invention is to provide the dual function of a windage cover and a cooling means for the turbine rotor.

Other features and advantages will be apparent from the specification and claims and from the accompanying drawings which illustrate an embodiment of the invention.

BEST MODE FOR CARRYING OUT THE INVENTION

Figure 1:
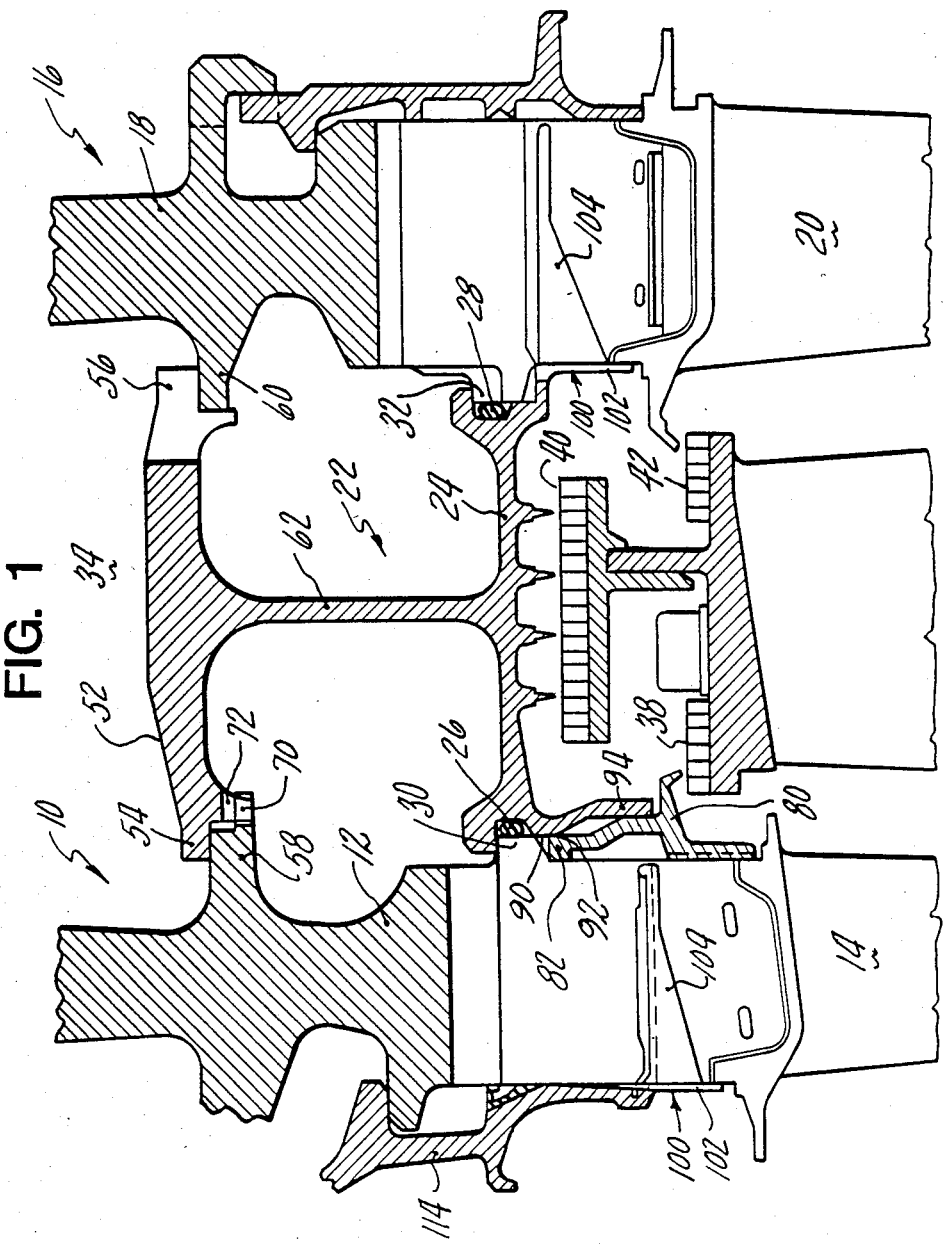
FIG. 1 is a partial view of the 1st and 2nd stages of the turbine of a gas turbine engine in cross section showing the improved rear side plate and its retention system.
Figure 3:
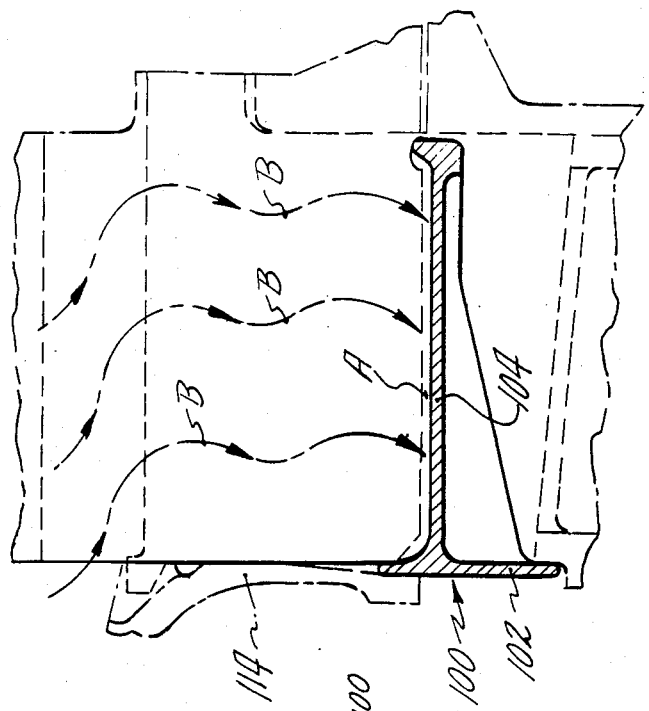

This invention is particularly suitable as the cover for the turbine rotors of a gas turbine power plant such as the engine models JT-9D, PW2037 and PW4000 manufactured by Pratt & Whitney Aircraft of United Technologies Corporation, the assignee of this patent application, the details of which are incorporated herein by reference. As best seen from FIGS. 1, 2 & 3, the first stage turbine generally illustrated by reference numeral 10 comprises a rotor disk 12 and a plurality of circumferentially spaced turbine blades 14 (only a portion being shown) suitably supported thereby. Likewise, the 2nd stage turbine generally illustrated by reference numeral 16 comprises a rotor disk 18 and a plurality of circumferentially spaced blades 20 (only a portion being shown) suitably supported thereby. Although not shown, it will be appreciated that both the 1st and 2nd stage turbines are coupled to a common shaft (not shown) and serve to extract energy from the engine's fluid working medium and transfer said energy in terms of R.P.M. to the engine's shaft.

As noted, the I-Beam (in cross section) seal generally indicated by reference numeral 22 comprises an outer rim 24 spanning between the rear of the disk 12 and the front of disk 18 and is configured so that the general shape is generally concentric to the engine's centerline. Annular 0-type seals 26 and 28 bear against the axial projections 30, and 32 respectfully to minimize leakage from the gas path that is outboard of the seal in the vicinity of the blades 14 and 20.

From the foregoing it is apparent that the rim 24 together with "0" seals 26 and 28 serve to seal the cavity 34 from the engines working fluid medium. Leakage around the blades adjacent the stator 36 are minimized by the labyrinth seals 38, 40 and 42. Similar to the lenticular seal in the U.S. Pat. No. 3,733,146, supra, the knife edges bear against the complimentary lands formed from honeycomb material when in the rotating mode and serve the same sealing function. Labyrinth seals are well known and are not a part of this invention.

As noted above, the upper rim 24 not only serves to support the knife edges of the labyrinth seal it provides axial stiffness to the 2nd stage turbine so as to tune it for the vibrating field to which it is subjected.

The inner rim 52 is slightly coned to form a convexed surface, the outer edges 54 and 56 underlie axial projections 58 and 60 and are snapped into place upon assembly. A flat annular plate or disk 62 support the inner rim and outer rim and in cross section resemble an "I" Beam. The rim 52 serves to take up the radial loads passing some of the radial stresses through the disks via the axial projections 58 and 60 and some through the flat plate 62. The flat plate 62 by virtue of this construction serves to minimize or control the growth of the knife edges on the outer rim 24.

The radial restraints 54 and 56 also serve to control the average tangential stress in the seal 22 for burst considerations and control local tangential stress for low cycle fatigue considerations.

The dimensions between the axial projection 60 on turbine disk 18 and the restraint 56 is selected to allow a leakage path from cavity 34 into the cavity between flat plate 62 and turbine disk 18 so as to balance the pressure across the flat plate 62. Obviously, because the cavity between plate 62 and the first turbine is in proximity to the first turbine where the pressure is highest, it tends to see a higher pressure than that which is on the opposing side. The gap provided adjacent restraint 56 tends to bleed pressure therein so as to balance these forces. While not preferred, this pressure differential could be alleviated further by locating holes within flat plate 62 itself.

Antirotation lugs 70 formed on disks 12 and 72 formed on rim 52 cooperate to prevent relative rotation to the turbine disks and seal in the event of a malfunction. The lenticular seal described in U.S. Pat. No. 4,332,133 supra contained a similar function.

Figure 2:
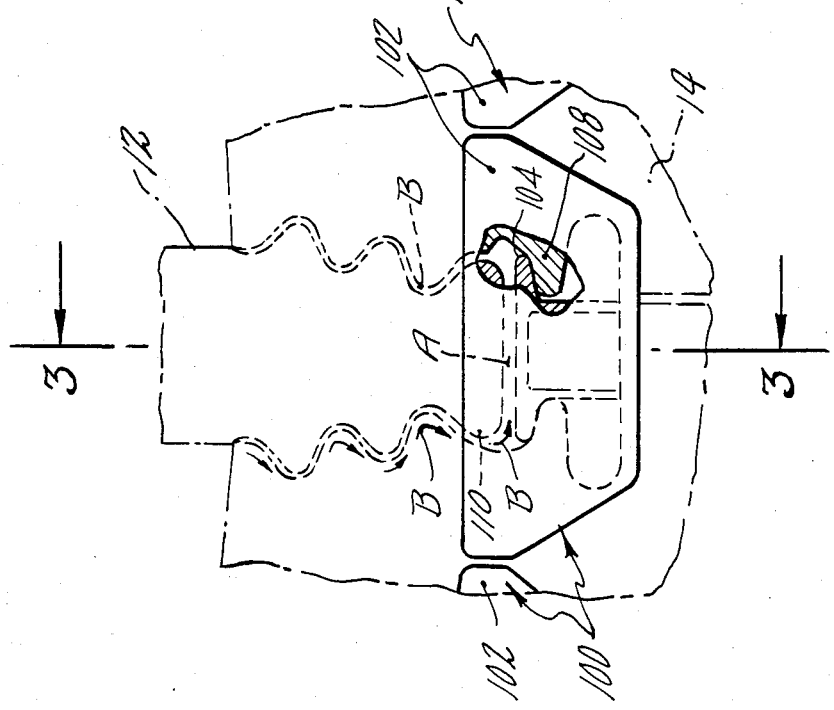
FIG. 2 is a partial view in elevation illustrating several of the cover-seal in their assembled position; and, FIG. 3 is a partial view partly in section and partly in elevation taken along lines 3—3 of FIG. 2.

In accordance with this invention the cover-seal generally illustrated by reference numeral 100 comprises a front plate 102 formed from a relatively flat member and fits flush against the face of the turbine disk 12 and 18, and an axial extending portion 104. Similar to the rear side plates, a plurality of these elements are mounted end-to-end around the circumference of the disk at the juncture where the root of the turbine blade fits into the disk broach. In this design the axial extending portion 104 extends between the fir tree tooth of the turbine blade and disk and is supported by the tooth of the turbine blade. This is best seen in FIG. 2 in the cutaway portion showing the axial extending portion 104 resting on tooth 108 of the turbine blade 14 between the rim 110 of disk 12 and turbine blade 14. These covers are restrained axially by the side plate 114 in the 1st turbine and the seal 22 in the second turbine.

As is apparent from the foregoing, the axial extension 104 provides a gap A extending the width of the disk rim between the disk rim and end of the turbine blade. As is illustrated by the arrows B, cool air (relative to the gas path) migrates to this gap and insulates the disk rim from the gas path. This, obviously, serves to reduce the disk rim temperature, thus, achieving the additional function of the coverseal that was heretofore solely utilized for windage. To some extent, the cover also provides axial blade retention in the forward direction (forward relative to the direction of the engine's gas path).

Thus, this invention in addition to the other features mentioned provides a relatively inexpensive means for cooling the turbine disk which not only increases the LCF life but also permits the use of less expensive disk materials.

It should be understood that the invention is not limited to the particular embodiments shown and described herein, but that various changes and modifications may be made without departing from the spirit and scope of this novel concept as defined by the following claims.

We claim:

1. For a gas turbine power plant having a turbine rotor comprising a turbine disk circumferentially supporting a plurality of radially extending turbine blades, each of said blades having a root section fitting into a recess formed on the rim of said turbine disk, cover means fitted adjacent the face of said disk at the juncture of said root section to overlie said recess and form a sealing means to prevent windage, each of said cover means including an axially extending portion extending axially into said recess adjacent but spaced from the rim of said disk defining a gap for retaining cooler air migrating thereto from the cooler portion of said turbine rotor for encapsulating cooler air so as to define an insulation barrier against the gas path of said power plant.

2. For a gas turbine power plant of claim 1 wherein said root section is dimensioned in a fir tree configuration and said cover means is supported radially by complementary blades of adjacent root sections of adjacent turbine blades.

* * * * *